(12) United States Patent
Jiang et al.

(10) Patent No.: US 12,250,629 B2
(45) Date of Patent: Mar. 11, 2025

(54) POWER-SAVING SIGNAL RECEIVING METHOD, POWER- SAVING SIGNAL SENDING METHOD, TERMINAL AND NETWORK DEVICE

(71) Applicant: VIVO MOBILE COMMUNICATION CO., LTD., Guangdong (CN)

(72) Inventors: Dajie Jiang, Guangdong (CN); Xueming Pan, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 458 days.

(21) Appl. No.: 17/708,603

(22) Filed: Mar. 30, 2022

(65) Prior Publication Data

US 2022/0225233 A1 Jul. 14, 2022

Related U.S. Application Data

(63) Continuation of application No. PCT/CN2020/117747, filed on Sep. 25, 2020.

(30) Foreign Application Priority Data

Sep. 30, 2019 (CN) .......................... 201910941519.2

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
CPC ......... H04W 52/0229; H04W 52/0216; H04W 52/0225; H04W 52/0235; H04W 52/028;
(Continued)

(56) References Cited

U.S. PATENT DOCUMENTS

2016/0286603 A1 9/2016 Vajapeyam et al.
2020/0214078 A1 7/2020 Jiang et al.
(Continued)

FOREIGN PATENT DOCUMENTS

CN 107431978 A 12/2017
CN 109327888 A 2/2019
(Continued)

OTHER PUBLICATIONS

Huawei, HiSilicon, PDCCH-based power saving signal/channel, Aug. 26-30, 2019, 3GPP TSG RAN WGI Meeting #98, R1-1908069, pp. 1-16 (Year: 2019).*

(Continued)

*Primary Examiner* — Farid Seyedvosoghi
(74) *Attorney, Agent, or Firm* — BROOKS KUSHMAN P.C.

(57) ABSTRACT

A power-saving signal receiving method, a power-saving signal sending method, a terminal and a network device are provided. The receiving method includes: receiving a power-saving signal, wherein the power-saving signal is used to indicate a terminal state for a serving cell, and the power-saving signal is further used to indicate a behavior of the terminal; the terminal state is one of dormancy and non-dormancy; the behavior of the terminal includes at least one of the following: whether to start a DRX onduration timer, and whether to monitor a PDCCH of the serving cell; and the PDCCH is a PDCCH corresponding to a DRX onduration timer associated with the power-saving signal.

15 Claims, 4 Drawing Sheets

(58) Field of Classification Search
CPC . H04W 52/0212; H04W 76/28; H04W 76/27; H04W 76/15; H04L 5/0098; H04L 5/001; Y02D 30/70
See application file for complete search history.

(56) References Cited

U.S. PATENT DOCUMENTS

| | | | |
|---|---|---|---|
| 2021/0007053 A1 | 1/2021 | Jiang et al. | |
| 2021/0051759 A1* | 2/2021 | Zhou | H04W 52/0206 |

FOREIGN PATENT DOCUMENTS

| | | |
|---|---|---|
| CN | 109429310 A | 3/2019 |
| CN | 110198557 A | 9/2019 |
| WO | 2019070808 A1 | 4/2019 |

OTHER PUBLICATIONS

Vivo, PDCCH-based power saving signal/channel design, Aug. 26-30, 2019, 3GPP TSG RAN WG1 #98, R1-1908170, pp. 1-13 (Year: 2019).*

First Office Action for Japanese Application No. 2022-519441, dated May 30, 2023, 3 Pages.

Vivo "PDCCH-based power saving signal/channel design" 3GPP TSG RAN WG1 #98, Prague, CZ, Aug. 2019, R1-1908170, 13 Pages.

Extended European Search Report for Application No. 20872549.9-1206, dated Oct. 17, 2022, 11 Pages.

MCC Support, "Draft Report of 3CPP TSG RAN WG1 #97 v0.3.0 (Reno, USA, May 13-17, 2019)," 3GPP TSG RAN WG1 #98, Aug. 26-30, 2019, R1-190XXXX, Prague, Czech Republic, 157 Pages.

Qualcomm Incorporated, "UE Adaptation to the Traffic and UE Power Consumption Characteristics," 3GPP TSG-RAN WG1 Ad-Hoc Meeting 1901, Agenda item 7.2.9.2.1, Jan. 21-25, 2019, R1-1900911, Taipei, Taiwan, 24 Pages.

Huawei et al., "PDCCH-based Power Saving Signal/Channel," 3GPP TSG RAN WG1 #98, Agenda item 7.2.9.1, Aug. 26-30, 2019, R1-1908069, Prague, Czech Republic, 16 Pages.

CATT, "Summary of PDCCH-based Power Saving Signal/Channel," 3GPP TSG RAN WG1 #98, Agenda item 7.2.9.1, Aug. 26-30, 2019, R1-1909732, Prague, Czech Republic, 28 Pages.

First Office Action for Chinese Application No. 201910941519.2, dated Aug. 26, 2021, 6 Pages.

International Search Report and Written Opinion for Application No. PCT/CN2020/117747, dated Dec. 31, 2020, 7 Pages.

Mvo, "Discussion on UE Adaptation to the Traffic and UE Power Consumption Characteristics," 3GPP TSG RAN WG1 #95, Agenda item 7.2.9.2.1, Nov. 12-16, 2018, R1-1812330, Spokane, WA, USA, 7 Pages.

Mvo, "Fast Scell Activation and Dormancy Like Behavior, " 3GPP TSG RAN WG1 #98bis, Agenda item 7.2.12.3, Oct. 14-20, 2019, R1-1910242, Chongqing, China, 11 Pages.

Third Office Action for Japanese Application No. 2022-519441, dated Jun. 18, 2024, 3 Pages.

Asia Pacific Telecom co. Ltd "UE behavior on WUS occasion in DRX Active Time" 3GPP TSG-RAN WG2 Meeting #107, Prague, Czech Republic, Aug. 2019, R2-1911618, 4 Pages.

Third Office Action for Japanese Application No. 2024-519441, dated Jun. 18, 2024, 3 Pages.

* cited by examiner

POWER-SAVING SIGNAL RECEIVING METHOD, POWER-SAVING SIGNAL SENDING METHOD, TERMINAL AND NETWORK DEVICE

CROSS-REFERENCE TO RELATED APPLICATIONS

This application is continuation application of PCT International Application No. PCT/CN2020/117747 filed on Sep. 25, 2020, which claims priority to Chinese Patent Application No. 201910941519.2, filed in China on Sep. 30, 2019, the disclosures of which are incorporated herein by reference in their entireties.

TECHNICAL FIELD

The present disclosure relates to the technical field of communication, and in particular, to a power-saving signal receiving method, a power-saving signal sending method, a terminal and a network device.

BACKGROUND

Energy saving of terminals has always been an import research topic in the technical field of communication. Discontinuous reception (DRX) mechanism is adopted in some communication systems, thereby saving the power consumption of terminals. However, in order to further saving the power consumption of terminals, some communication systems, such as a $5^{th}$ generation (5G) system, introduce a power-saving signal, but the power-saving signal in related art only can indicate the terminal to monitor a physical downlink control channel (PDCCH), that is, the terminal monitors the PDCCH after receiving the power-saving signal. Due to the relatively poor indicating performance of the power-saving signal, the power-saving effect of the terminal is relatively poor.

SUMMARY

According to a first aspect, embodiments of the present disclosure provide a power-saving signal receiving method, applied to a terminal. The method includes:
receiving a power-saving signal, wherein the power-saving signal is used to indicate a terminal state for a serving cell, and the power-saving signal is further used to indicate a behavior of the terminal;
the terminal state is one of dormancy and non-dormancy; and the behavior of the terminal includes at least one of the following:
whether to start a DRX onduration timer, and
whether to monitor a physical downlink control channel (PDCCH) of the serving cell, wherein the PDCCH is a PDCCH corresponding to a DRX onduration timer associated with the power-saving signal.

According to a second aspect, embodiments of the present disclosure provide a power-saving signal sending method, applied to a network device. The method includes:
sending a power-saving signal, wherein the power-saving signal is used to indicate a terminal state for a serving cell, and the power-saving signal is further used to indicate a behavior of the terminal;
the terminal state is one of dormancy and non-dormancy; and the behavior of the terminal includes at least one of the following:
whether to start a DRX onduration timer, and
whether to monitor the PDCCH of the serving cell, wherein the PDCCH is a PDCCH corresponding to a DRX onduration timer associated with the power-saving signal.

According to a third aspect, embodiments of the present disclosure provide a terminal, including:
a receiving module, configured to receive a power-saving signal, wherein the power-saving signal is used to indicate a terminal state for a serving cell, and the power-saving signal is further used to indicate a behavior of the terminal;
the terminal state is one of dormancy and non-dormancy; and
the behavior of the terminal includes at least one of the following:
whether to start a DRX onduration timer, and
whether to monitor the PDCCH of the serving cell, wherein the PDCCH is a PDCCH corresponding to a DRX onduration timer associated with the power-saving signal.

According to a fourth aspect, an embodiment of the present disclosure provides a network device, including:
a sending module, configured to send a power-saving signal, wherein the power-saving signal is used to indicate a terminal state for a serving cell, and the power-saving signal is further used to indicate a behavior of the terminal;
the terminal state is one of dormancy and non-dormancy; and
the behavior of the terminal includes at least one of the following:
whether to start a DRX onduration timer, and
whether to monitor the PDCCH of the serving cell, wherein the PDCCH is a PDCCH corresponding to a DRX onduration timer associated with the power-saving signal.

According to a fifth aspect, embodiments of the present disclosure provide a terminal, including a memory, a processor, and a program stored in the memory and capable of running on the processor, wherein when the program is executed by the processor, the steps of the power-saving signal receiving method provided by the embodiments of the present disclosure are implemented.

According to a sixth aspect, embodiments of the present disclosure provide a network device, including a memory, a processor, and a program stored in the memory and capable of running on the processor, wherein when the program is executed by the processor, the steps of the power-saving signal sending method provided by the embodiments of the present disclosure are implemented.

According to a seventh aspect, embodiments of the present disclosure provide a computer readable storage medium. The computer readable storage medium stores a computer program. When the computer program is executed by a processor, the steps of the power-saving signal receiving method provided by the embodiments of the present disclosure are implemented, or when the computer program is executed by a processor, the steps of the power-saving signal sending method provided by the embodiments of the present disclosure are implemented.

DETAILED DESCRIPTION

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the description and the claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the word such as "example" or "for example" is used to represent giving an example, an illustration, or a description. Any embodiment or design scheme described as an "exemplary" or "example" in the embodiments of the present disclosure should not be explained as being more preferred or having more advantages than another embodiment or design scheme. To be precise, the use of the term such as "exemplary" or "for example" is intended to present a related concept in a specific manner.

The embodiments of the present disclosure are described below with reference to the accompanying drawings. A power-saving signal receiving method, a power-saving signal sending method, a terminal and a network device provided by the embodiments of the present disclosure may be applied to a wireless communication system. The wireless communications system may be a 5G system, an evolved long term evolution (eLTE) system, or a subsequent evolved communications system.

Figure 1:
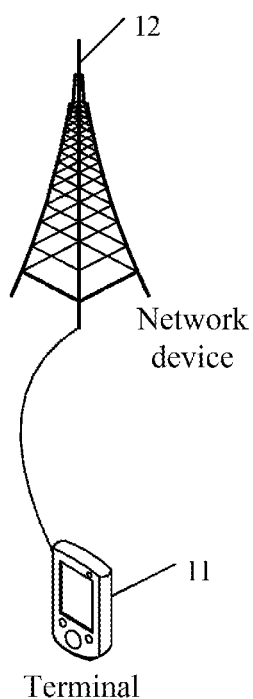
FIG. 1 is a structural diagram of a network system applicable to an embodiment of the present disclosure.

Referring to FIG. 1, FIG. 1 is a structural diagram of a network system applicable to an embodiment of the present disclosure. As shown in FIG. 1, the network system includes: a terminal 11 and a network device 12, where the terminal 11 may be user equipment (UE) or another terminal side device, for example, a terminal side device such as a mobile phone, a tablet personal computer, a laptop computer, a personal digital assistant (PDA), a mobile Internet device (MID), a wearable device, or a robot. It should be noted that a specific type of the terminal 11 is not limited in the embodiment of the present disclosure. The above network device 12 may be a $4^{th}$ generation (4G) base station, or a 5G base station, or a base station of a later version, or a station in other communication systems, or be called as a node B, an evolved node B, or a transmission reception point (TRP), or an access point (AP), or other words in the field. As long as the same technical effect is achieved, the network device is not limited to specific technical words. In addition, the network device 12 may be a master node (MN) or a secondary node (SN). It should be noted that in embodiments of the present disclosure, only the 5G base station is used as an example, but a specific type of the network device is not limited.

Figure 2:
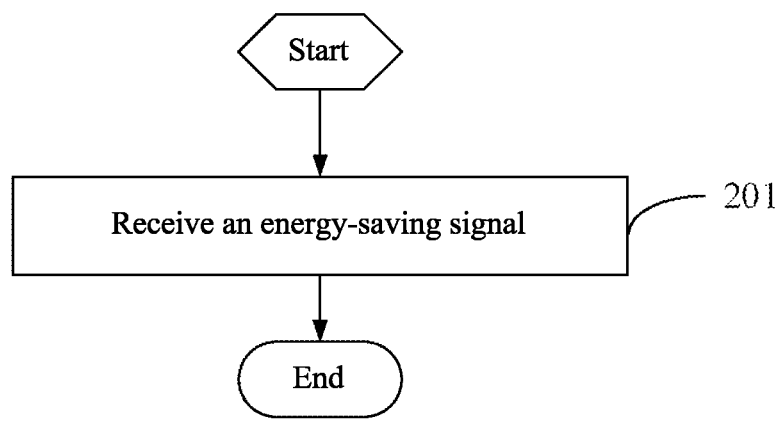
FIG. 2 is a flowchart of a power-saving signal receiving method according to an embodiment of the present disclosure.

Referring to FIG. 2, FIG. 2 is a flowchart of a power-saving signal receiving method according to an embodiment of the present disclosure. The method is applied to a terminal, and as shown in FIG. 2, includes the following steps:

Step 201: receiving a power-saving signal, wherein the power-saving signal is used to indicate a terminal state for a serving cell, and the power-saving signal is further used to indicate a behavior of the terminal;

the terminal state is one of dormancy (which may be called dormant state or dormancy-like state) and non-dormancy (which may be called non-dormant state or non-dormancy-like state);

the behavior of the terminal includes at least one of the following:

whether to start a DRX onduration timer, and whether to monitor the PDCCH of the serving cell, wherein the PDCCH is a PDCCH corresponding to a DRX onduration timer associated with the power-saving signal.

The power-saving signal may also be called a wake-up signal (WUS) or a sleep signal. The power-saving signal may be used to indicate a plurality of terminals, and may also be used to indicate one terminal.

The above indication of the terminal in the serving cell may be: indicating the terminal in one or more serving cells, and in different serving cells may be the same or different, for example: taking a plurality of serving cells as an example, the power-saving signal may indicate in one part of cells as a dormant state, and in the other part of cells as a non-dormant state, or may indicate in all serving cells as a dormant state.

The above serving cell may include at least one of the following:

a primary cell (Pcell), a primary secondary cell (PScell) and a secondary cell (Scell).

The above serving cell may include one or more cells, for example: the above serving cell may refer to one or more cells in one or more cell groups, such as one or more cells in a master cell group (MCG) and one or more cells in a secondary cell group (SCG), or one or more cells in a primary cell group, or one or more cells in a secondary cell group.

Preferably, the terminal monitors the power-saving signal sent by the primary cell or the primary secondary cell, that is, the secondary cell does not send the power-saving signal. Of course, solutions which are not limited thereto may also be included.

In addition, in the dormant state, the terminal may not monitor the PDCCH of the serving cell, or in the dormant state, the monitoring period for the terminal to monitor the PDCCH of the serving cell may be a first period; and in the non-dormant state, the monitoring period for the terminal to monitor the PDCCH of the serving cell may be a second period, wherein the duration of the first period is greater than the duration of the second period.

That the duration of the first period is greater than the duration of the second period may be: the frequency of the terminal monitoring the PDCCH of the serving cell in the dormant state is lower than that of the terminal monitoring the PDCCH of the serving cell in the non-dormant state.

For example: in the dormant state, according to the network side configuration, the terminal does not monitor the PDCCH or the period of the terminal monitoring the PDCCH is long, for example, the PDCCH is monitored every 2,560 slots, and in this state, the electricity-saving performance of the terminal is higher; and in the non-dormant state, the terminal monitors the PDCCH frequently according to the network side configuration, for example, the PDCCH is monitored every downlink slot, or the PDCCH is monitored every other one slot, and in this state, the electricity-saving performance of the terminal is lower than that in the dormant state.

It should be noted that the first period and the second period may be configured by a network side, or may be agreed by a protocol.

Preferably, the PDCCH related to the dormant state and the non-dormant state may be further limited, for example, the PDCCH is a PDCCH scrambled by a cell radio network temporary identifier (C-RNTI) or a configured scheduling radio network temporary identifier (CS-RNTI). Of course, solutions which are not limited thereto may also be included.

The whether to start the DRX onduration timer of the serving cell may be: when the power-saving signal indicates the terminal to start the DRX of the serving cell, the terminal starts the DRX onduration timer of the serving cell and taking the cell as a unit, thereby improving the power-saving effect of the terminal. Further, the terminal states and behaviors of the terminal in a plurality of serving cells are indicated through one power-saving signal, so that signaling overhead can be saved.

As an optional implementation manner, the power-saving signal indicates the terminal states in N serving cells respectively by N bits; or the power-saving signal indicates the terminal states for N serving cells by M bits, wherein M is an integer less than the N, each codepoint of the M bits is used to indicate the terminal states for a plurality of serving cells, and N is an integer greater than 1.

The N serving cells may be part of all serving cells in all serving cells or cell groups of the terminal, for example: the N serving cells may be one or more Scells, but not including Pcell/PScell. For example, the power-saving signal does not include the bit indicating the Pcell/PScell terminal, of course, it may also include no limitation thereto.

In addition, the above mode of N bits may be: one bit corresponds to one cell, that is, 1 bit of the power-saving signal indicates the terminal state of one cell, so that the terminal in each serving cell can be indicated flexibly and directly, for example, 15 bits respectively indicate in 15 cells.

That the terminal states for N serving cells are indicated by M bits may be: M bits adopt joint coding to indicate the terminal states for N serving cells, or adopt other coding modes to indicate the terminal states for N serving cells.

That each codepoint is used to indicate the terminal states for a plurality of serving cells may be: each codepoint is used to indicate the terminal state combination of the terminal in all or part of N serving cells, so that a plurality of codepoints of the M bits may indicate a plurality of state combinations. For example, as shown in table 1, in table 1, D/N respectively represents a dormancy/non-dormant state.

TABLE 1

| Codepoint | Cell 1 | Cell 2 | Cell 3 | Cell 4 | Cell 5 | Cell 6 | Cell 7 | Cell 8 | Cell 9 | Cell 10 | Cell 11 | Cell 12 | Cell 13 | Cell 14 | Cell 15 |
|---|---|---|---|---|---|---|---|---|---|---|---|---|---|---|---|
| 00000 | D | D | D | D | D | D | D | D | D | D | D | D | D | D | D |
| 00001 | N | N | D | D | D | D | D | D | D | D | D | D | D | D | D |
| 00010 | D | D | N | N | D | D | D | D | D | D | D | D | D | D | D |
| ... | | | | | | | | | | | | | | | | monitors the PDCCH in the timer; and in a case that the power-saving signal indicates not to start the DRX onduration timer of the serving cell, the terminal does not start the DRX onduration timer so as to save electricity.

The whether to monitor the PDCCH of the serving cell may be: when the power-saving signal indicates the terminal to monitor the PDCCH of the serving cell, the terminal monitors the PDCCH of the serving cell; and in a case that the power-saving signal indicates not to monitor the PDCCH of the serving cell so as to save electricity.

In addition, the receiving the power-saving signal may be: receiving the signal sent by a network device, for example: the terminal monitors the power-saving signal in a radio resource control (RRC) connection state, which may further be non active time in the RRC connection state.

In the embodiments of the present disclosure, the terminal state and the behavior of the terminal may be flexibly indicated through the above steps, and may be indicated by It should be noted that there are only 3 codepoints in table 1 for illustration. Taking 5 bits as an example, there are 32 codepoints in 5 bits, so that 32 codepoints may indicate 32 state combinations of 15 serving cells so as to save the signaling overhead of the power-saving signal.

In addition, in some scenarios, in order to simplify the complexity of indicating the terminal in the cell by the power-saving signal, the terminal state combinations of some unimportant terminals may be removed. For example: taking the case where N bits indicate N cells of the terminal as an example, the N bits may be regarded as a bitmap, so that some unimportant codepoints in the bitmap may be excluded.

For another example, 15 serving cells may be divided into 5 groups, and each group includes 3 serving cells, so that the terminal states of 5 serving cell groups (totally 15 cells) can be indicated only through the bitmap of 5 bits. The terminal states of three serving cells in one group are the same.

The mode of indicating the terminal states for N serving cells by M bits can save the signaling overhead.

It should be noted that the mode of indicating the terminal states for N serving cells by N bits or M bits may be configured through the RRC signaling by the network side, or may be agreed by a protocol.

Optionally, in a case that the power-saving signal indicates the terminal to start DRX onduration timers of all serving cells, the terminal determines the terminal states for N serving cells according to the N bits or the M bits.

That the power-saving signal indicates the terminal to start DRX onduration timers of all serving cells may be: the power-saving signal indicates the terminal to start the DRX onduration timers of all serving cells by 1 bit or a plurality of bits.

In this implementation manner, in a case that the terminal is indicated to start the DRX onduration timers of all serving cells, the terminal determines the terminal states for N serving cells according to N bits or M bits. In this way, the error caused by determining the terminal states for N serving cells according to N bits or M bits in a case that the terminal indicates that the DRX onduration timers of all serving cells of the terminal are not started can be avoided, and the power consumption of the terminal can be further saved.

Of course, in a case that the power-saving signal indicates the terminal to monitor the PDCCHs of all serving cells by 1 bit, the terminal may also determine the terminal states for N serving cells according to N bits or M bits.

Optionally, in a case that the power-saving signal indicates that the DRX onduration timers of all serving cells are not started, and the N bits or M bits indicate the terminal in at least one serving cell is a non-dormant state,
 the terminal does not expect to receive the power-saving signal; or
 the terminal performs the non-dormancy behavior for the at least one serving cell.

That the power-saving signal indicates the terminal to start DRX onduration timers of all serving cells may be: the power-saving signal indicates the terminal to start the DRX onduration timers of all serving cells by 1 bit or a plurality of bits.

That the terminal does not expect to receive the power-saving signal may be: the terminal regards this case as an error case.

That the terminal performs the non-dormancy behavior for the at least one serving cell may be: in a case that the DRX onduration timers of all serving cells are not started, the terminal is in a non-dormant state for the serving cell.

For example: 1 bit (a0) in the power-saving signal indicates the serving cell in the cell group whether to start the DRX onduration timer, other bits (a1, a2, a3, . . . a15) indicate in a plurality of Scells. For the case where a0=0 and at least one of a1, a2, a3, . . . a15 is 1, processing is as follows:
 one is that this case is regarded as an error case, and the terminal does not expect to receive this indication; or
 the other one is that this case is a normal case, and at this time, the terminal does not start the DRX onduration timer, and performs the behavior of the non-dormant state of the corresponding serving cells indicated by a1, a2, a3, . . . a15.

In this implementation manner, since for the above case, the power does not expect to receive the power-saving signal, or the terminal performs the non-dormancy behavior for the at least one serving cell, the power consumption of the terminal can be further saved.

Optionally, in a case that the power-saving signal indicates the terminal states in N serving cells to be all dormant states, the N bits or the M bits are further used to indicate at least one of the following:
 the DRX onduration timers of all serving cells are not started; and
 the PDCCHs of all serving cells are not monitored.

In this implementation manner, in a case that the terminal states in N serving cells are indicated to be the dormant state, it is defaulted that the power-saving signal further indicates at least one of the following: the DRX onduration timers of all serving cells are not started and the PDCCHs of all serving cells are not monitored, so that the signaling overhead is saved.

Optionally, in a case that the N bits are a first combination, the N bits or the M bits are further used to indicate at least one of the following:
 the DRX onduration timers of all serving cells are not started; and
 the PDCCHs of all serving cells are not monitored.

The first combination may be configured through the RRC signaling by the network side, or may be agreed by a protocol.

In this implementation manner, in a case that the N bits is the first combination, it is defaulted that the power-saving signal further indicates at least one of the following: the DRX onduration timers of all serving cells are not started and the PDCCHs of all serving cells are not monitored, so that the signaling overhead is saved.

In this implementation manner, the power-saving signal may only carry the N bits or the M bits.

Optionally, in a case that the M bits are a second combination, the N bits or the M bits are further used to indicate at least one of the following:
 not starting the DRX onduration timers of all serving cells,
 and not monitoring the PDCCHs of all serving cells.

The second combination may be configured through the RRC signaling by the network side, or may be agreed by a protocol.

In this implementation manner, in a case that the M bits is the second combination, it is defaulted that the power-saving signal further indicates at least one of the following: the DRX onduration timers of all serving cells are not started and the PDCCHs of all serving cells are not monitored, so that the signaling overhead is saved.

In this implementation manner, the power-saving signal may only carry the N bits or the M bits.

Optionally, the power-saving signal may only carry the N bits or the M bits. For example: it is unnecessary to carry the bit dedicated to indicating the above behavior, so as to save the signaling overhead. For example: there is no 1 bit (such as a0) in the power-saving signal to indicate the above behavior, and only a1-a15 are used to indicate in 15 Scells. At this time, a1-a15 may be all equal to 0 to determine that the terminal does not start the DRX onduration timer, or a certain special combination of a1-a15 may be used to indicate not to start the DRX onduration timer. This special combination is configured by the RRC signaling by the network side, or is agreed by a protocol.

As an optional implementation manner, the power-saving signal indicates the behavior of the terminal by 1 bit; or
 the power-saving signal indicates the behavior of the terminal by a plurality of bits.

In a case that the power-saving signal indicates the behavior of the terminal by a plurality of bits, the terminal may have the same behavior or different behaviors for a plurality of serving cells.

That the above behavior is indicated by 1 bit may be: the behavior of the terminal in each serving cell is indicated by 1 bit to be consistent, for example: in a case that the 1 bit is a first value, it may indicate at least one of the following: starting the DRX onduration timers of all serving cells and monitoring the PDCCHs of all serving cells; and in a case that the 1 bit is a second value, it may indicate at least one of the following:

not starting the DRX onduration timers of all serving cells, and not monitoring the PDCCHs of all serving cells.

The all serving cells may be all serving cells of the terminal, or may be all serving cells in a cell group. Of course, the all serving cells may refer to all Scells, or may also refer to all serving cells corresponding to in the serving cell indicated by the power-saving signal, for example: the N serving cells.

Through the 1 bit indication, a plurality of serving cells may share the same bit, for example: sharing the same MAC entity, so as to save the signaling overhead. Taking the case where the 1 bit is a0, (1 bit in the power-saving signal) as an example, a0 may indicate the serving cell in the cell group whether to start the DRX onduration timer; the terminal receives the power-saving signal, in a case that a0=0, the terminal does not start the DRX onduration timer of the serving cell in the cell group; and in a case that a0=1, the terminal starts the DRX onduration timer of the serving cell in the cell group.

That the power-saving signal indicates the behavior of the terminal through a plurality of bit may be: the behaviors of the terminal in different serving cells are indicated through different bits, for example: the behaviors of the terminal in N serving cells are indicated by N bits, or the behaviors of the terminal in N serving cells are indicated by M bits, for example: a plurality of serving cells respectively adopt the corresponding bit, or corresponding MAC entity for indication. This implementation manner may flexibly configure the behaviors of the terminal in different serving cells so as to save the power consumption of the terminal.

Optionally, in a case that the power-saving signal indicates that the terminal in the serving cell is a non-dormant state, the behavior of the terminal is determined according to the 1 bit or the value of the plurality of bits.

The 1 bit and the plurality of bits here may be 1 bit and a plurality of bits indicating the behavior of the terminal in the above implementation manner. That the power-saving signal indicates that the terminal in the serving cell is a non-dormant state may be: indicating that the terminal states for N serving cells are the non-dormant state, for example, indication through the N bits or M bits.

For example: the power-saving signal includes 16 bits such as a0, a1, a2, a3, . . . a15, wherein a0 is used to indicate the above behavior, for example, a0 indicates the serving cell in the cell group whether to start the DRX onduration timer, and the other bits are used to indicate in 15 serving cells; in a case that the power-saving signal is received and a1, a2, a3, . . . a15 are all 0, all serving cells in the cell group do not start the DRX onduration timer; and other cases determine whether to start the DRX onduration timer according to a0, and a1, a2, a3, . . . a15 indicate in a plurality of Scells.

In this implementation manner, the behavior of the terminal may be determined according to the value of 1 bit only when the power-saving signal indicates that the terminal states for N serving cells are the non-dormant state, otherwise, it may directly determine that the DRX onduration timers of all serving cells are not started, and the PDCCHs of all serving cells are not monitored, so that the complexity is reduced.

As an optional implementation manner, in a case that the power-saving signal indicates that the DRX onduration timers of all serving cells are not started, the terminal determines that the bit indicating the terminal in the serving cell in the power-saving signal is invalid, or determines that in the serving cell are all dormant states.

It may be: determining that the terminal states for N serving cells are all dormant states.

That the power-saving signal indicates the terminal to start DRX onduration timers of all serving cells may be: the power-saving signal indicates the terminal to start the DRX onduration timers of all serving cells by 1 bit or a plurality of bits.

In this implementation manner, in a case that the DRX onduration timers of all serving cells are indicated not to be started by 1 bit, it may directly determine that the bit indicating the terminal in the serving cell in the power-saving signal is invalid, or determine that the terminal states for N serving cells are all dormant states, so that the working efficiency of the terminal is improved, and the power consumption of the terminal is further saved.

For example: 1 bit (a0) in the power-saving signal indicates the serving cell in the cell group whether to start the DRX onduration timer, other bit (a1, a2, a3, . . . a15) indicates in a plurality of Scells, wherein in a case that a0=0, the serving cell in the cell group does not start the DRX onduration timer; in a case that a0=1, the serving cell in the cell group starts the DRX onduration timer; any bit of a1, a2, a3, . . . a15 is 0, then the corresponding Scell is in the dormant state; any bit of a1, a2, a3, . . . a15 is 1, the corresponding Scell is in the non-dormant state; the behaviors corresponding to a1, a2, a3, . . . a15 may be take effect only when a0=1, that is, when a0=0, a1-a15 are invalid indications, not representing the terminal in Scell; or when a0=0, the terminal assumes that all cells are in the dormant state.

Of course, in a case that the power-saving signal indicates that the PDCCHs of all serving cells of the terminal are not monitored by 1 bit, the terminal also determines that the bit indicating the terminal in the serving cell in the power-saving signal is invalid, or determines that the terminal states for N serving cells are all dormant states.

As an optional implementation manner, the method further includes:

in a case that the terminal receives the power-saving signal, determining to start DRX onduration timers of all serving cells, and/or monitor PDCCHs of all serving cells.

In this implementation manner, as long as receiving the power-saving signal, the terminal determines that the DRX onduration timers of all serving cells are started, and/or the PDCCHs of all serving cells are monitored, so that it may be unnecessary to add other bit to indicate the above behavior, thereby saving the signaling overhead.

As an optional implementation manner, after receiving the power-saving signal, the terminal performs at least one of the following according to the indication of the power-saving signal:

entering the dormant state or the non-dormant state for the serving cell;

starting or not starting the DRX onduration timer of the serving cell; and monitoring or not monitoring the PDCCH of the serving cell.

In this implementation manner, at least one of the above may be performed according to the indication of the power-saving signal.

In the embodiments of the present disclosure, a power-saving signal is received, wherein the power-saving signal is used to indicate a terminal state for a serving cell, and the power-saving signal is further used to indicate a behavior of the terminal; the terminal state is one of dormancy and non-dormancy; the behavior of the terminal includes at least one of the following: whether to start a DRX onduration timer, and whether to monitor a PDCCH of the serving cell; and the PDCCH is a PDCCH corresponding to a DRX onduration timer associated with the power-saving signal. In this way, the power-saving signal flexibly indicates the terminal state and the behavior of the terminal, so that the power-saving effect of the terminal can be improved.

The power-saving signal receiving method provided by the embodiments of the present disclosure will be illustrated below on the basis that the power-saving signal indicates in 15 Scells.

Embodiment 1

In this embodiment, a power-saving signal includes 16 bit, and explicitly indicates whether to start a DRX onduration timer of a serving cell.

1. For an NR carrier aggregation (CA) scenario, assuming one Pcell and 15 Scells, the power-saving signal includes 16 bit, wherein 1 bit (a0) indicates a cell in a cell group whether to start a DRX onduration timer, and other 15 bit (a1, a2, a3, . . . a15) indicates the dormancy/non-dormant state of a plurality of Scell.

In a case that a0=0, the cell in the cell group does not start the DRX onduration timer; and in a case that a0=1, the cell in the cell group starts the DRX onduration timer.

Any bit of a1, a2, a3, . . . a15 is 0, then the corresponding Scell is in the dormant state; and any bit of a1, a2, a3, . . . a15 is 1, then the corresponding Scell is in the non-dormant state. Optionally, the above behavior takes effect only when a0=1, that is, when a0=0, a1-a15 are invalid indications, not representing the dormancy/non-dormant state, or when a0=0, the terminal assumes that all serving cells are in the dormant state, wherein a0=0 may represent that the terminal does not start the DRX onduration timers of all serving cells, at this time, the network device expects the terminal not to monitor the PDCCH, or expects the terminal to be in the dormant state, the optimal solution is that a1-a15 do not take effect at this time.

For the case where a0=0 and at least one of a1, a2, a3, . . . a15 is 1, processing is as follows:

this case is regarded as an error case, the terminal does not expect to receive this indication; or this case is a normal case, at this time, the terminal does not start the DRX onduration timer, and performs the behavior of the non-dormant state of the corresponding cells indicated by a1, a2, a3, . . . a15.

Embodiment 2

In this embodiment, the power-saving signal includes 15 bits, and implicitly indicates whether to start the DRX onduration timer, for example: at this time, all serving cells are indirectly/implicitly indicated not to start the DRX onduration timer through the values of a1, a2, a3, . . . a15 (for example the values are all 0, that is, all Scells are in the dormant state), 1 bit, that is, a0 is saved compared with the solution 1.

For the NRCA scenario, assuming one Pcell and 15 Scells, the power-saving signal includes 15 bits (a1, a2, a3, . . . a15), which respectively indicate the dormancy/non-dormant state of a plurality of Scells, and there is no bit for indicating the related state of the Pcell.

a1-a15 are all 0, determining that all serving cells of the terminal do not start the DRX onduration timer; and a1-a15 are not all 0, indicating that all serving cells of the terminal start the DRX onduration timer; or a certain special combination of a1-a15 is used to indicate that all serving cells do not start the DRX onduration timer, and other combinations are used to indicate that all serving cells of UE start the DRX onduration timer; and the special combination is configured through the RRC signaling by the network side, or is predefined by a protocol.

Compared with the embodiment 1, the embodiment 2 saves 1 bit overhead.

The embodiments of the present disclosure may realize the following:

I. The terminal at the RRC connection state receives the power-saving signal sent by the network side, and the power-saving signal indicates the dormancy/non-dormant state of the cell in the cell group (MCG or SCG);

one solution: 1 to 1 indication: 1 bit to 1 cell; and
another solution: a joint coding method is adopted.

II. The power-saving signal simultaneously indicates whether to start the DRX onduration timer, or indicate the cell whether to monitor the PDCCH of the DRX onduration timer associated with the power-saving signal;

one solution: all cells share one MAC entity, such as 1 bit indication; and another solution: different cells have respective MAC entities, such as multi-bit indication.

III. The rule of whether the terminal starts the DRX onduration timer may include:

the first rule: when UE receives the power-saving signal, the DRX onduration timers of all cells are started;

the second rule: whether to start the DRX onduration timer is determined according to the value of a0;

the third rule: determination is performed according to a0 and the case where all values are 0 is excluded, that is, a0=1, and the values of a1, a2, . . . a15 are not all 0, the DRX onduration timer is started, otherwise, the DRX onduration timer is not started; and the fourth rule: determination is performed according to a1, a2, . . . a15, that is, the values of a1, a2, . . . a15 are all 0, then the DRX onduration timer is not started.

IV. 1 bit (a0) in the power-saving signal indicates the cell in the cell group whether to start the DRX onduration timer, and another bit (a1, a2, a3, . . . a15) indicates the dormancy/non-dormant state of a plurality of Scells.

V. The power-saving signal includes 15 bits, and implicitly indicates whether to start the DRX onduration timer. At this time, all cells are indirectly/implicitly indicated not to start the DRX onduration timer through the values of a1, a2, a3, . . . a15 (for example the values are all 0, that is, all Scells are in the dormant state), and 1 bit, that is a0 is saved.

Figure 3:
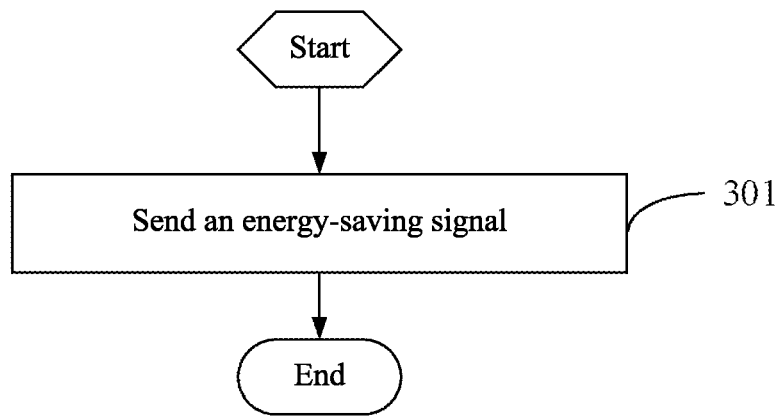
FIG. 3 is a flowchart of a power-saving signal sending method according to an embodiment of the present disclosure.

Referring to FIG. 3, FIG. 3 is a flowchart of a power-saving signal sending method according to an embodiment of the present disclosure. The method is applied to a network device, and as shown in FIG. 3, includes the following steps:

Step 301: sending a power-saving signal, wherein the power-saving signal is used to indicate a terminal state for a serving cell, and the power-saving signal is further used to indicate a behavior of the terminal;

the terminal state is one of dormancy and non-dormancy; and the behavior of the terminal includes at least one of the following:

whether to start a DRX onduration timer, and whether to monitor the PDCCH of the serving cell, wherein the PDCCH is a PDCCH corresponding to a DRX onduration timer associated with the power-saving signal.

Optionally, the serving cell includes at least one of the following:

Pcell, PScell and Scell.

Optionally, the power-saving signal indicates the terminal states in N serving cells respectively by N bits; or the power-saving signal indicates the terminal states for N serving cells by M bits, wherein M is an integer less than the N, each codepoint of the M bits is used to indicate the terminal states for a plurality of serving cells, and N is an integer greater than 1.

Optionally, in a case that the power-saving signal indicates the terminal to start DRX onduration timers of all serving cells, the terminal determines the terminal states for N serving cells according to the N bits or the M bits.

Optionally, in a case that the power-saving signal indicates that the DRX onduration timers of all serving cells are not started, and the N bits or M bits indicate the terminal in at least one serving cell is a non-dormant state, the terminal does not expect to receive the power-saving signal; or the terminal performs the non-dormancy behavior for the at least one serving cell.

Optionally, in a case that the power-saving signal indicates the terminal states in N serving cells to be all dormant states, the N bits or the M bits are further used to indicate at least one of the following:

the DRX onduration timers of all serving cells are not started; and the PDCCHs of all serving cells are not monitored.

Optionally, in a case that the N bits are a first combination, the N bits or the M bits are further used to indicate at least one of the following:

the DRX onduration timers of all serving cells are not started; and the PDCCHs of all serving cells are not monitored.

Optionally, in a case that the M bits are a second combination, the N bits or the M bits are further used to indicate at least one of the following:

the DRX onduration timers of all serving cells are not started; and the PDCCHs of all serving cells are not monitored.

Optionally, the power-saving signal only carries the N bits or the M bits.

Optionally, in a case that the power-saving signal indicates the DRX onduration timers of all serving cells not to be started, the terminal determines that the bit indicating the terminal in the serving cell in the power-saving signal is invalid, or determines that the terminal in the serving cell is a non-dormant state.

Optionally, the power-saving signal indicates the behavior of the terminal through 1 bit; or the power-saving signal indicates the behavior of the terminal by a plurality of bits.

Optionally, in a case that the 1 bit is a first value, it indicates at least one of the following: starting the DRX onduration timers of all serving cells and monitoring the PDCCHs of all serving cells; and in a case that the 1 bit is a second value, it indicates at least one of the following: not starting the DRX onduration timers of all serving cells and not monitoring the PDCCHs of all serving cells.

Optionally, in a case that the power-saving signal indicates that the terminal in the serving cell is a non-dormant state, the behavior of the terminal is determined according to the 1 bit or the value of the plurality of bits.

Optionally, in a case that the terminal receives the power-saving signal, the power-saving signal is used for the terminal to determine to start DRX onduration timers of all serving cells, and/or monitor PDCCHs of all serving cells.

Optionally, in the dormant state, the terminal may not monitor the PDCCH of the serving cell, or in the dormant state, the monitoring period for the terminal to monitor the PDCCH of the serving cell may be a first period; and in the non-dormant state, the monitoring period for the terminal to monitor the PDCCH of the serving cell is a second period, wherein the duration of the first period is greater than the duration of the second period.

It should be noted that this embodiment is used as an implementation of the network device corresponding to the embodiment shown in FIG. 2. For a specific implementation of this embodiment, refer to the related descriptions of the embodiment shown in FIG. 2. To avoid repeated descriptions, details are not described again in this embodiment. In this embodiment, the power-saving effect of the terminal can also be improved.

Figure 4:
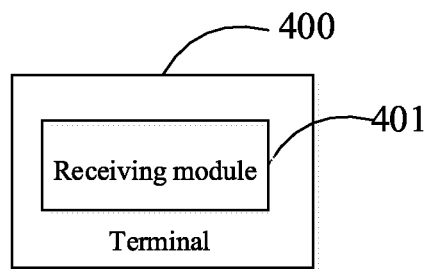
FIG. 4 is a structural diagram of a terminal according to an embodiment of the present disclosure.

Referring to FIG. 4, FIG. 4 is a structural diagram of a terminal according to an embodiment of the present disclosure. As shown in FIG. 4, the terminal 400 includes:

a receiving module 401, configured to receive a power-saving signal, wherein the power-saving signal is used to indicate a terminal state for a serving cell, and the power-saving signal is further used to indicate a behavior of the terminal;

the terminal state is one of dormancy and non-dormancy; and the behavior of the terminal includes at least one of the following:

whether to start a DRX onduration timer, and whether to monitor the PDCCH of the serving cell, wherein the PDCCH is a PDCCH corresponding to a DRX onduration timer associated with the power-saving signal.

Optionally, the serving cell includes at least one of the following:

Pcell, PScell and Scell.

Optionally, the power-saving signal indicates the terminal states in N serving cells respectively by N bits; or the power-saving signal indicates the terminal states for N serving cells by M bits, wherein M is an integer less than the N, each codepoint of the M bits is used to indicate the terminal states for a plurality of serving cells, and N is an integer greater than 1.

Optionally, in a case that the power-saving signal indicates the terminal to start DRX onduration timers of all serving cells, the terminal determines the terminal states for N serving cells according to the N bits or the M bits.

Optionally, in a case that the power-saving signal indicates that the DRX onduration timers of all serving cells are not started, and the N bits or M bits indicate the terminal in at least one serving cell is a non-dormant state, the terminal does not expect to receive the power-saving signal; or the terminal performs the non-dormancy behavior for the at least one serving cell.

Optionally, in a case that the power-saving signal indicates the terminal states in N serving cells to be all dormant states, the N bits or the M bits are further used to indicate at least one of the following:

the DRX onduration timers of all serving cells are not started; and the PDCCHs of all serving cells are not monitored.

Optionally, in a case that the N bits are a first combination, the N bits or the M bits are further used to indicate at least one of the following:

the DRX onduration timers of all serving cells are not started; and the PDCCHs of all serving cells are not monitored.

Optionally, in a case that the M bits are a second combination, the N bits or the M bits are further used to indicate at least one of the following:

the DRX onduration timers of all serving cells are not started; and the PDCCHs of all serving cells are not monitored.

Optionally, the power-saving signal only carries the N bits or the M bits.

Optionally, in a case that the power-saving signal indicates the DRX onduration timers of all serving cells not to be started, the terminal determines that the bit indicating the terminal in the serving cell in the power-saving signal is invalid, or determines that the terminal in the serving cell is a non-dormant state.

Optionally, the power-saving signal indicates the behavior of the terminal through 1 bit; or the power-saving signal indicates the behavior of the terminal by a plurality of bits.

Optionally, in a case that the 1 bit is a first value, it indicates at least one of the following: starting the DRX onduration timers of all serving cells and monitoring the PDCCHs of all serving cells; and in a case that the 1 bit is a second value, it indicates at least one of the following: not starting the DRX onduration timers of all serving cells and not monitoring the PDCCHs of all serving cells.

Optionally, in a case that the power-saving signal indicates that the terminal in the serving cell is a non-dormant state, the behavior of the terminal is determined according to the 1 bit or the value of the plurality of bits.

Figure 5A:
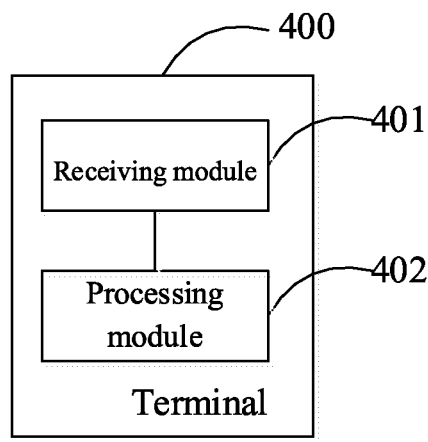
FIG. 5a is a structural diagram of another terminal according to another embodiment of the present disclosure.

Optionally, as shown in FIG. 5a, the terminal 400 further includes:

a processing module 402, configured to, in a case that the terminal receives the power-saving signal, determine to start DRX onduration timers of all serving cells, and/or monitor PDCCHs of all serving cells.

Optionally, in the dormant state, the terminal may not monitor the PDCCH of the serving cell, or in the dormant state, the monitoring period for the terminal to monitor the PDCCH of the serving cell may be a first period; and in the non-dormant state, the monitoring period for the terminal to monitor the PDCCH of the serving cell is a second period, wherein the duration of the first period is greater than the duration of the second period.

Figure 5B:
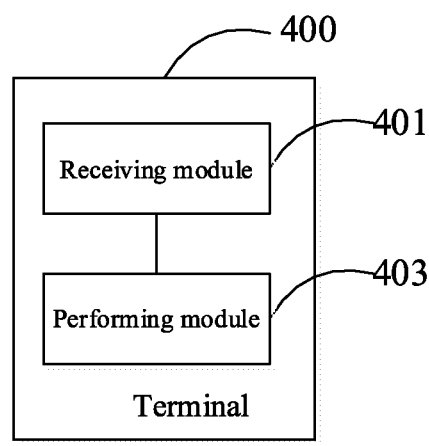
FIG. 5b is a structural diagram of another terminal according to an embodiment of the present disclosure.

Optionally, after receiving the power-saving signal, as shown in FIG. 5b, the terminal 400 further includes a performing module 403, configured to perform at least one of the following according to the indication of the power-saving signal:

entering the dormant state or the non-dormant state for the serving cell;

starting or not starting the DRX onduration timer of the serving cell; and monitoring or not monitoring the PDCCH of the serving cell.

The terminal provided by the embodiments of the present disclosure can implement the processes implemented by the terminal in the method embodiment in FIG. 2. To avoid repetition, details are not described herein again, and the power-saving effect of the terminal can be improved.

Figure 6:
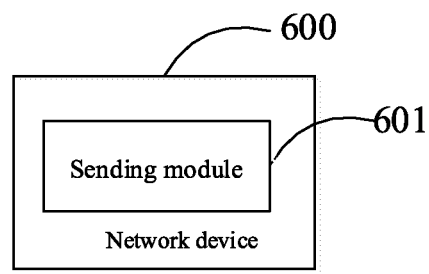
FIG. 6 is a structural diagram of a network device according to an embodiment of the present disclosure.

Referring to FIG. 6, FIG. 6 is a structural diagram of a network device according to an embodiment of the present disclosure. As shown in FIG. 6, the network device 600 includes:

a sending module 601, configured to send a power-saving signal, wherein the power-saving signal is used to indicate a terminal state for a serving cell, and the power-saving signal is further used to indicate a behavior of the terminal;

the terminal state is one of dormancy and non-dormancy; and the behavior of the terminal includes at least one of the following: whether to start a DRX onduration timer, and whether to monitor the PDCCH of the serving cell, wherein the PDCCH is a PDCCH corresponding to a DRX onduration timer associated with the power-saving signal.

Optionally, the serving cell includes at least one of the following:

Pcell, PScell and Scell.

Optionally, the power-saving signal indicates the terminal states in N serving cells respectively by N bits; or the power-saving signal indicates the terminal states for N serving cells by M bits, wherein M is an integer less than the N, each codepoint of the M bits is used to indicate the terminal states for a plurality of serving cells, and N is an integer greater than 1.

Optionally, in a case that the power-saving signal indicates the terminal to start DRX onduration timers of all serving cells, the terminal determines the terminal states for N serving cells according to the N bits or the M bits.

Optionally, in a case that the power-saving signal indicates that the DRX onduration timers of all serving cells are not started, and the N bits or M bits indicate the terminal in at least one serving cell is a non-dormant state, the terminal does not expect to receive the power-saving signal; or the terminal performs the non-dormancy behavior for the at least one serving cell.

Optionally, in a case that the power-saving signal indicates the terminal states in N serving cells to be all dormant states, the N bits or the M bits are further used to indicate at least one of the following:

the DRX onduration timers of all serving cells are not started; and the PDCCHs of all serving cells are not monitored.

Optionally, in a case that the N bits are a first combination, the N bits or the M bits are further used to indicate at least one of the following:

the DRX onduration timers of all serving cells are not started; and the PDCCHs of all serving cells are not monitored.

Optionally, in a case that the M bits are a second combination, the N bits or the M bits are further used to indicate at least one of the following:
the DRX onduration timers of all serving cells are not started; and
the PDCCHs of all serving cells are not monitored.

Optionally, the power-saving signal only carries the N bits or the M bits.

Optionally, in a case that the power-saving signal indicates the DRX onduration timers of all serving cells not to be started, the terminal determines that the bit indicating the terminal in the serving cell in the power-saving signal is invalid, or determines that the terminal in the serving cell is a non-dormant state.

Optionally, the power-saving signal indicates the behavior of the terminal through 1 bit; or
the power-saving signal indicates the behavior of the terminal by a plurality of bits.

Optionally, in a case that the 1 bit is a first value, it indicates at least one of the following: starting the DRX onduration timers of all serving cells and monitoring the PDCCHs of all serving cells; and
in a case that the 1 bit is a second value, it indicates at least one of the following: not starting the DRX onduration timers of all serving cells and not monitoring the PDCCHs of all serving cells.

Optionally, in a case that the power-saving signal indicates that the terminal in the serving cell is a non-dormant state, the behavior of the terminal is determined according to the 1 bit or the value of the plurality of bits.

Optionally, in a case that the terminal receives the power-saving signal, the power-saving signal is used for the terminal to determine to start DRX onduration timers of all serving cells, and/or monitor PDCCHs of all serving cells.

Optionally, in the dormant state, the terminal may not monitor the PDCCH of the serving cell, or in the dormant state, the monitoring period for the terminal to monitor the PDCCH of the serving cell may be a first period; and
in the non-dormant state, the monitoring period for the terminal to monitor the PDCCH of the serving cell is a second period,
wherein the duration of the first period is greater than the duration of the second period.

The network device provided by the embodiments of the present disclosure can implement the processes implemented by the network device in the method embodiment in FIG. 5. To avoid repetition, details are not described herein again, and the power-saving effect of the terminal can be improved.

Figure 7:
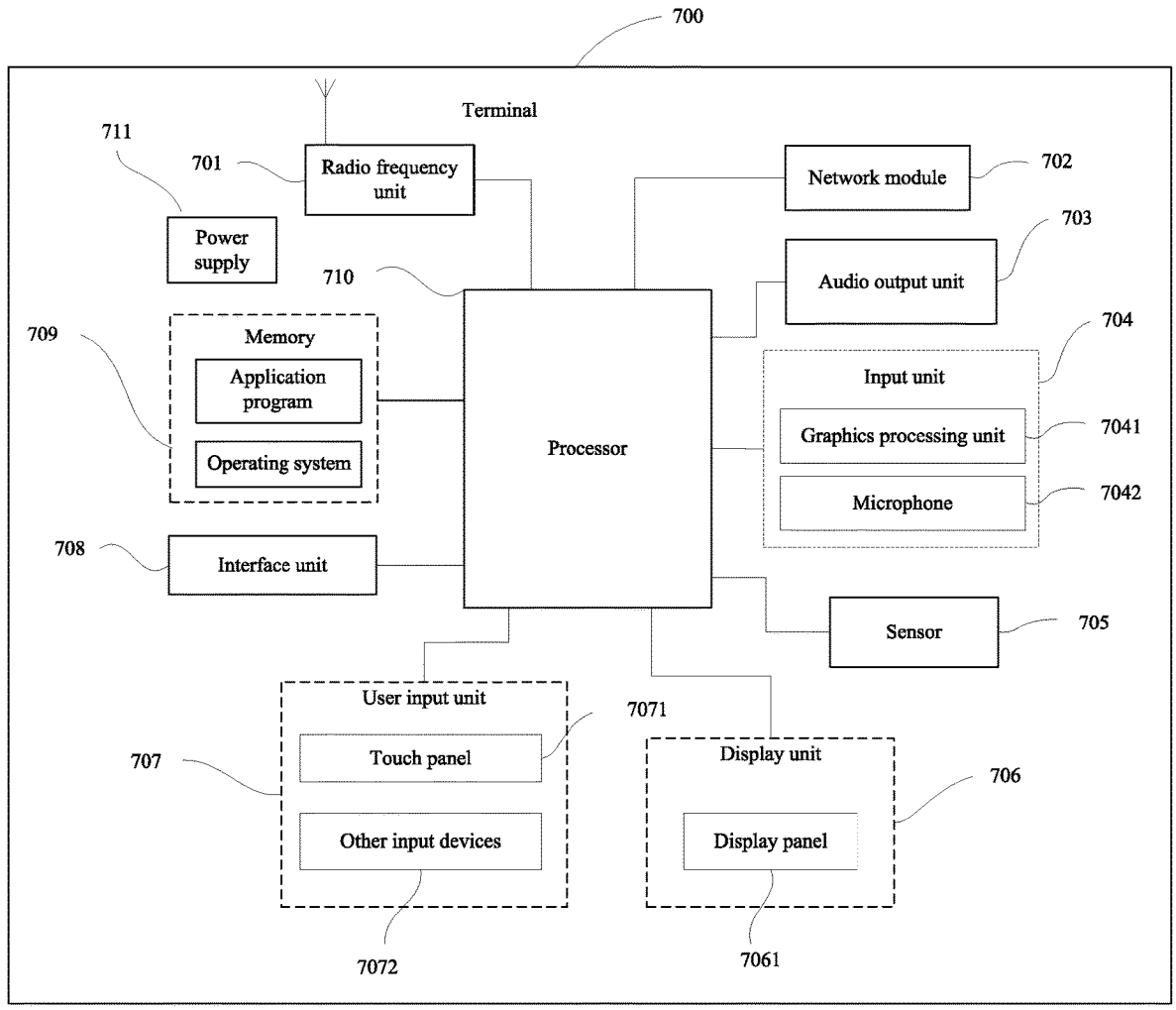
FIG. 7 is a structural diagram of another terminal according to another embodiment of the present disclosure.

FIG. 7 is a schematic structural diagram of hardware of a terminal implementing embodiments of the present disclosure. The terminal 700 includes but is not limited to: a radio frequency unit 701, a network module 702, an audio output unit 703, an input unit 704, a sensor 705, a display unit 706, a user input unit 707, an interface unit 708, a memory 709, a processor 710, a power supply 711, and other components. Those skilled in the art may understand that the terminal structure shown in FIG. 7 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a notebook computer, a palmtop computer, an in-vehicle terminal, a robot, a wearable device, a pedometer, and the like.

A radio frequency unit 701 is configured to receive a power-saving signal, wherein the power-saving signal is used to indicate a terminal state for a serving cell, and the power-saving signal is further used to indicate a behavior of the terminal;
the terminal state is one of dormancy and non-dormancy; and
the behavior of the terminal includes at least one of the following:
whether to start a DRX onduration timer, and
whether to monitor the PDCCH of the serving cell, wherein the PDCCH is a PDCCH corresponding to a DRX onduration timer associated with the power-saving signal.

Optionally, the serving cell includes at least one of the following: Pcell, PScell and Scell.

Optionally, the power-saving signal indicates the terminal states in N serving cells respectively by N bits; or
the power-saving signal indicates the terminal states for N serving cells by M bits, wherein M is an integer less than the N, each codepoint of the M bits is used to indicate the terminal states for a plurality of serving cells, and
N is an integer greater than 1.

Optionally, in a case that the power-saving signal indicates the terminal to start DRX onduration timers of all serving cells, the terminal determines the terminal states for N serving cells according to the N bits or the M bits.

Optionally, in a case that the power-saving signal indicates that the DRX onduration timers of all serving cells are not started, and the N bits or M bits indicate the terminal in at least one serving cell is a non-dormant state,
the terminal does not expect to receive the power-saving signal; or
the terminal performs the non-dormancy behavior for the at least one serving cell.

Optionally, in a case that the power-saving signal indicates the terminal states in N serving cells to be all dormant states, the N bits or the M bits are further used to indicate at least one of the following:
the DRX onduration timers of all serving cells are not started; and
the PDCCHs of all serving cells are not monitored.

Optionally, in a case that the N bits are a first combination, the N bits or the M bits are further used to indicate at least one of the following:
the DRX onduration timers of all serving cells are not started; and
the PDCCHs of all serving cells are not monitored.

Optionally, in a case that the M bits are a second combination, the N bits or the M bits are further used to indicate at least one of the following:
the DRX onduration timers of all serving cells are not started; and
the PDCCHs of all serving cells are not monitored.

Optionally, the power-saving signal only carries the N bits or the M bits.

Optionally, in a case that the power-saving signal indicates the DRX onduration timers of all serving cells not to be started, the terminal determines that the bit indicating the terminal in the serving cell in the power-saving signal is invalid, or determines that the terminal in the serving cell is a non-dormant state.

Optionally, the power-saving signal indicates the behavior of the terminal through 1 bit; or
the power-saving signal indicates the behavior of the terminal by a plurality of bits.

Optionally, in a case that the 1 bit is a first value, it indicates at least one of the following: starting the DRX onduration timers of all serving cells and monitoring the PDCCHs of all serving cells; and in a case that the 1 bit is a second value, it indicates at least one of the following: not starting the DRX onduration timers of all serving cells and not monitoring the PDCCHs of all serving cells.

Optionally, in a case that the power-saving signal indicates that the terminal in the serving cell is a non-dormant state, the behavior of the terminal is determined according to the 1 bit or the value of the plurality of bits.

Optionally, a processing module 710 is configured to, in a case that the terminal receives the power-saving signal, determine to start DRX onduration timers of all serving cells, and/or monitor PDCCHs of all serving cells.

Optionally, in the dormant state, the terminal may not monitor the PDCCH of the serving cell, or in the dormant state, the monitoring period for the terminal to monitor the PDCCH of the serving cell may be a first period; and in the non-dormant state, the monitoring period for the terminal to monitor the PDCCH of the serving cell is a second period,
wherein the duration of the first period is greater than the duration of the second period.

Optionally, after receiving the power-saving signal, the radio frequency unit 701 or the processor 710 is further configured to perform at least one of the following according to the indication of the power-saving signal:

entering the dormant state or the non-dormant state for the serving cell;
starting or not starting the DRX onduration timer of the serving cell; and
monitoring or not monitoring the PDCCH of the serving cell.

The terminal can improve the power-saving effect of the terminal.

It should be understood that, in this embodiment of the present disclosure, the radio frequency unit 701 may be configured to receive and send signals in an information receiving and sending process or a calling process. Specifically, after receiving downlink data from a base station, the radio frequency unit 701 sends the downlink data to the processor 710 for processing, and sends uplink data to the base station. Generally, the radio frequency unit 701 includes, but is not limited to, an antenna, at least one amplifier, a transceiver, a coupler, a low noise amplifier, and a duplexer, and the like. In addition, the radio frequency unit 701 may also communicate with a network and other devices through a wireless communication system.

The terminal provides wireless broadband Internet access for a user by using a network module 702, for example, helping the user send and receive an email, browsing a web page, and accessing streaming media.

The audio output unit 703 may convert audio data received by the radio frequency unit 701 or the network module 702 or stored in the memory 709 into an audio signal and output the audio signal as a sound. Moreover, the audio output unit 703 may further provide audio output related to a specific function performed by the terminal 700 (such as a call signal reception sound, a message reception sound, or the like). The audio output unit 703 includes a speaker, a buzzer, a telephone receiver, and the like.

The input unit 704 is configured to receive audio or radio frequency signals. The input unit 704 may include a graphics processing unit (GPU) 7041 and a microphone 7042. The graphics processing unit 7041 is used to process image data of a static picture or a video obtained by an image capturing device (for example, a camera) in a video capturing mode or an image capturing mode. A processed image frame may be displayed on the display unit 706. The image frame processed by the graphics processor 7041 may be stored in the memory 709 (or another storage medium) or transmitted by using the radio frequency unit 701 or the network module 702. The microphone 7042 may receive sound and can process such sound into audio data. The audio data obtained through processing may be converted, in a telephone call mode, into a format that may be sent to a mobile communication base station via the radio frequency unit 701 for output.

The user equipment 700 further includes at least one sensor 705, such as an optional sensor, a motion sensor, and another sensor. Specifically, the light sensor includes an ambient light sensor and a proximity sensor. The ambient light sensor may adjust luminance of the display panel 7061 based on brightness of ambient light. The proximity sensor may turn off the display panel 7061 and/or backlight when the terminal 700 moves to an ear. As a type of the motion sensor, an accelerometer sensor may detect magnitude of an acceleration in each direction (generally three axes), and may detect magnitude and a direction of gravity when being static. The accelerometer sensor may be used for recognizing terminal gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. This is not described herein again.

The display unit 706 is configured to display information entered by the user or information provided for the user. The display unit 706 may include the display panel 7061, and the display panel 7061 may be configured in a form of a liquid crystal display (LCD), an organic light-emitting diode (OLED), or the like.

The user input unit 707 may be configured to receive input digit or character information and generate key signal input related to user settings and function control of the terminal. Specifically, the user input unit 707 includes a touch panel 7071 and another input device 7072. The touch panel 7071, also called a touch screen, may collect touch operation on or near the touch panel by users (for example, operation on the touch panel 7071 or near the touch panel 7071 by fingers or any suitable objects or accessories such as a touch pen by the users). The touch panel 7071 may include two parts: a touch detection device and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 710, and can receive and execute a command sent by the processor 710. In addition, the touch panel 7071 may be implemented by various types such as a resistive type, a capacitive type, an infrared ray type or a surface acoustic wave type. In addition to the touch panel 7071, the user input unit 707 may further include other input devices 7072. Specifically, the other input devices 7072 may include but are not limited to: a physical keyboard, a function key (such as a volume control key, a switch key), a trackball, a mouse, and a joystick, which is no longer repeated here.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. Although in FIG. 7, the touch panel 7071 and the display panel 7061 are used as two independent components to implement input and output functions of the terminal, in some embodiments, the touch panel 7071 and the display panel 7061 may be integrated to implement the input and output functions of the mobile terminal. This is not specifically limited herein.

The interface unit 708 is an interface connecting an external apparatus to the user equipment 700. For example, the external device may include a wired or wireless headset jack, an external power supply (or a battery charger) port, a wired or wireless data port, a storage card port, a port for connecting a device having an identification module, an audio input/output (I/O) port, a video I/O port, a headset jack, or the like. The interface unit 708 may be configured to receive input (for example, data information and power) from the external apparatus and transmit the received input to one or more elements in the terminal 700, or may be configured to transmit data between the terminal 700 and the external apparatus.

The memory 709 may be configured to store a software program and various data. The memory 709 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 709 may include a high-speed random access memory or a nonvolatile memory, for example, at least one disk storage device, a flash memory, or other volatile solid-state storage devices.

The processor 710 is a control center of the terminal, and connects all parts of the entire terminal through various interfaces and lines. By running or executing a software program and/or a module stored in the memory 709 and invoking data stored in the memory 709, the processor 710 performs various functions of the terminal and data processing, to perform overall monitoring on the terminal. The processor 710 may include one or more processing units. Optionally, the processor 710 may integrate an application processor with a modem processor. The application processor mainly processes the operating system, a user interface, the application program, and the like. The modem processor mainly processes wireless communication. It may be understood that the modem processor may not be integrated into the processor 710.

The terminal 700 may further include the power supply 711 (for example, a battery) configured to supply power to various components. Optionally, the power supply 711 may be logically connected to the processor 710 through a power management system, so as to implement functions such as managing charging, discharging, and power consumption through the power management system.

In addition, the user equipment 700 includes some function modules not shown, and details are not described herein again.

Optionally, the embodiments of the present disclosure further provide a terminal, including a processor 710, a memory 709, and a computer program stored in the memory 709 and capable of running on the processor 710. When the computer program is executed by the processor 710, the processes of the power-saving signal receiving method embodiments are implemented, and a same technical effect can be achieved. To avoid repetition, details are not described herein again.

Figure 8:
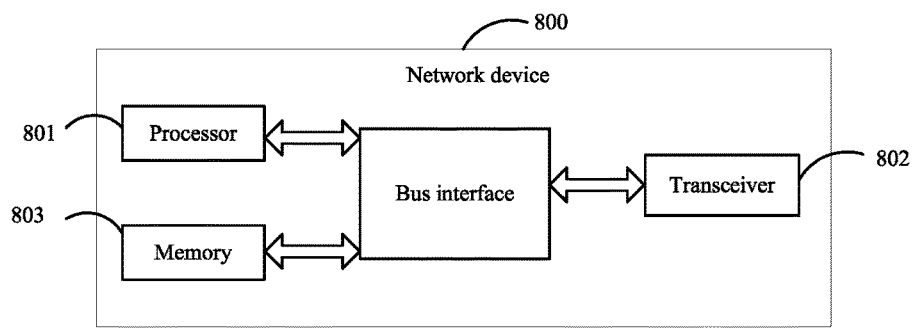
FIG. 8 is a structural diagram of another network device according to an embodiment of the present disclosure.

Referring to FIG. 8, FIG. 8 is a structural diagram of another network device according to an embodiment of the present disclosure. As shown in FIG. 8, the network device 800 includes: a processor 801, a transceiver 802, a memory 803 and a bus interface.

A transceiver 802 is configured to send a power-saving signal, wherein the power-saving signal is used to indicate a terminal state for a serving cell, and the power-saving signal is further used to indicate a behavior of the terminal;
  the terminal state is one of dormancy and non-dormancy; and
  the behavior of the terminal includes at least one of the following:
  whether to start a DRX onduration timer, and
  whether to monitor the PDCCH of the serving cell, wherein the PDCCH is a PDCCH corresponding to a DRX onduration timer associated with the power-saving signal.

Optionally, the serving cell includes at least one of the following:
  Pcell, PScell and Scell.

Optionally, the power-saving signal indicates the terminal states in N serving cells respectively by N bits; or
  the power-saving signal indicates the terminal states for N serving cells by M bits, wherein M is an integer less than the N, each codepoint of the M bits is used to indicate the terminal states for a plurality of serving cells, and
  N is an integer greater than 1.

Optionally, in a case that the power-saving signal indicates the terminal to start DRX onduration timers of all serving cells, the terminal determines the terminal states for N serving cells according to the N bits or the M bits.

Optionally, in a case that the power-saving signal indicates that the DRX onduration timers of all serving cells are not started, and the N bits or M bits indicate the terminal in at least one serving cell is a non-dormant state,
  the terminal does not expect to receive the power-saving signal; or
  the terminal performs the non-dormancy behavior for the at least one serving cell.

Optionally, in a case that the power-saving signal indicates the terminal states in N serving cells to be all dormant states, the N bits or the M bits are further used to indicate at least one of the following:
  the DRX onduration timers of all serving cells are not started; and
  the PDCCHs of all serving cells are not monitored.

Optionally, in a case that the N bits are a first combination, the N bits or the M bits are further used to indicate at least one of the following:
  not starting the DRX onduration timers of all serving cells, and not monitoring the PDCCHs of all serving cells.

Optionally, in a case that the M bits are a second combination, the N bits or the M bits are further used to indicate at least one of the following:
  the DRX onduration timers of all serving cells are not started; and
  the PDCCHs of all serving cells are not monitored.

Optionally, the power-saving signal only carries the N bits or the M bits.

Optionally, in a case that the power-saving signal indicates that the DRX onduration timers of all serving cells are not started, the terminal determines that the bit indicating the terminal in the serving cell in the power-saving signal is invalid, or determines that the terminal in the serving cell is a non-dormant state.

Optionally, the power-saving signal indicates the behavior of the terminal by 1 bit; or the power-saving signal indicates the behavior of the terminal by a plurality of bits.

Optionally, in a case that the 1 bit is a first value, it indicates at least one of the following: starting the DRX onduration timers of all serving cells and monitoring the PDCCHs of all serving cells; and in a case that the 1 bit is a second value, it indicates at least one of the following: not starting the DRX onduration timers of all serving cells and not monitoring the PDCCHs of all serving cells.

Optionally, in a case that the power-saving signal indicates that the terminal in the serving cell is a non-dormant state, the behavior of the terminal is determined according to the 1 bit or the value of the plurality of bits.

Optionally, in a case that the terminal receives the power-saving signal, the power-saving signal is used for the terminal to determine to start DRX onduration timers of all serving cells, and/or monitor PDCCHs of all serving cells.

Optionally, in the dormant state, the terminal may not monitor the PDCCH of the serving cell, or in the dormant state, the monitoring period for the terminal to monitor the PDCCH of the serving cell may be a first period; and in the non-dormant state, the monitoring period for the terminal to monitor the PDCCH of the serving cell is a second period, wherein the duration of the first period is greater than the duration of the second period.

The network device can improve the power-saving effect of the terminal.

The transceiver 802 is configured to receive and transmit data under the control of the processor 801. The transceiver 802 includes at least two antenna ports.

In FIG. 8, a bus architecture may include any quantity of interconnected buses and bridges, which are specifically connected together by one or more processors represented by the processor 801 and various circuits of a memory represented by the memory 803. The bus architecture may further link various other circuits such as those of a peripheral device, a voltage regulator, and a power management circuit. These are well known in the art, and therefore are not further described in this specification. The bus interface provides an interface. The transceiver 802 may be a plurality of elements, in other words, include a transmitter and a receiver, and provide a unit for communicating with various other devices on a transmission medium. For different user equipment, a user interface 804 may also be an interface capable of connecting externally and internally to a required device. The connected device includes but is not limited to a keypad, a display, a speaker, a microphone, a joystick, and the like.

The processor 801 is responsible for managing the bus architecture and common processing, and the memory 803 may store data used when the processor 801 performs an operation.

Optionally, embodiments of the present disclosure further provide a network device, including a processor 801, a memory 803, and a computer program stored in the memory 803 and capable of running on the processor 801. When the computer program is executed by the processor 801, the processes of the power-saving signal sending method embodiment are implemented, and a same technical effect achieved. To avoid repetition, details are not described herein again.

Embodiments of the present disclosure further provide a computer readable storage medium. The computer readable storage medium stores a computer program. When the computer program is executed by a processor, the power-saving signal receiving method provided by the embodiments of the present disclosure is implemented, or when the computer program is executed by a processor, the power-saving signal sending method provided by the embodiments of the present disclosure is implemented, and a same technical effect achieved. To avoid repetition, details are not described herein again. The computer-readable storage medium is, for example, a read-only memory (ROM), a random access memory (RAM), a magnetic disk, or an optical disc.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. In the absence of more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on the understanding, the technical solutions of the present disclosure essentially or the part that contributes to the related art may be embodied in the form of software products. The computer software product is stored in a storage medium (such as ROM/RAM, a magnetic disk and an optical disk), including several instructions for enabling one terminal (which may be a mobile phone, a computer, a server, or a network device) to implement the method in each embodiment of the present disclosure.

A person of ordinary skill in the art may be aware that, in combination with the examples described in the embodiments disclosed in this specification, units and algorithm steps may be implemented by electronic hardware or a combination of computer software and electronic hardware. Whether these functions are performed by using hardware or software depends on a specific application and design constraints of the technical solutions. A person of ordinary skill in the art may use different methods to achieve the described functions for each particular application, but it should not be considered that the implementation goes beyond the scope of the present disclosure.

A person of ordinary skill in the art may clearly understand that, for convenient and simple description, for the specific working processes of the system, apparatus, and unit described above, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected according to actual needs to achieve the objective of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for enabling a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, the module, unit, and subunit may be implemented in one or more application specific integrated circuits (ASIC), a digital signal processor (DSP), a DSP device (DSPD), a programmable logic device (PLD), a field-programmable gate array (FPGA), general processors, controllers, micro-controllers, micro-processors, and other electronic units for implementing the functions of the present application, or their combinations.

For implementation with software, technologies described in the embodiments of the present disclosure may be implemented by executing functional modules (for example, a process and a function) in the embodiments of the present disclosure. Software code may be stored in the memory and executed by the processor. The memory may be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A power-saving signal receiving method, applied to a terminal, wherein the method comprising:
receiving a power-saving signal, wherein the power-saving signal is used to indicate a terminal state for a secondary cell (Scell), and the power-saving signal is further used to indicate a behavior of the terminal;
the terminal state is one of dormancy and non-dormancy; and
the behavior of the terminal comprises at least one of the following:
whether to start a discontinuous reception (DRX) onduration timer or not, and
whether to monitor a physical downlink control channel (PDCCH) of the Scell, wherein the PDCCH is a PDCCH corresponding to a DRX onduration timer associated with the power-saving signal;
wherein the power-saving signal indicates the terminal state for N Scells respectively by N bits; or
the power-saving signal indicates the terminal state for N Scells by M bits, wherein M is an integer less than the N, each codepoint in the M bits is used to indicate the terminal state for a plurality of Scells, and
N is an integer greater than 1;
wherein the power-saving signal only carries the N bits or the M bits.

2. The method according to claim 1, wherein in a case that the power-saving signal indicates the terminal to start DRX onduration timers of all Scells, the terminal determines the terminal states for N Scells according to the N bits or the M bits.

3. The method according to claim 1, wherein in a case that the power-saving signal indicates that the DRX onduration timers of all Scells are not started, and the N bits or the M bits indicate the terminal in at least one Scell is a non-dormant state,
the terminal does not expect to receive the power-saving signal; or
the terminal performs non-dormancy behavior for the at least one Scell.

4. The method according to claim 1, wherein in a case that the power-saving signal indicates that the DRX onduration timers of all Scells are not started, the terminal determines that the bit indicating the terminal in the Scell in the power-saving signal is invalid, or determines that the terminal state for the Scell is a non-dormant state.

5. The method according to claim 1, wherein the power-saving signal indicates the behavior of the terminal by 1 bit;
in a case that the 1 bit is a first value, it indicates at least one of the following: starting the DRX onduration timers of all Scells and monitoring the PDCCHs of all Scells; and
in a case that the 1 bit is a second value, it indicates at least one of the following: not starting the DRX onduration timers of all Scells and not monitoring the PDCCHs of all Scells.

6. The method according to claim 1, wherein the terminal does not monitor the PDCCH of the Scell in a dormant state, or, the monitoring period for the terminal to monitor the PDCCH of the Scell in the dormant state is a first period; and state the monitoring period for the terminal to monitor the PDCCH of the Scell in a non-dormant state is a second period, wherein the duration of the first period is greater than the duration of the second period.

7. A network device, comprising a memory, a processor, and a program stored in the memory and capable of running on the processor, wherein when the program is executed by the processor, following steps are implemented:

sending a power-saving signal, wherein the power-saving signal is used to indicate a terminal state for a secondary cell (Scell), and the power-saving signal is further used to indicate a behavior of the terminal;

the terminal state is one of dormancy and non-dormancy; and the behavior of the terminal comprises at least one of the following:

whether to start a discontinuous reception (DRX) onduration timer, and whether to monitor a physical downlink control channel (PDCCH) of the Scell, wherein the PDCCH is a PDCCH corresponding to a DRX onduration timer associated with the power-saving signal;

wherein the power-saving signal indicates the terminal state for N Scells respectively by N bits; or the power-saving signal indicates the terminal state for N Scells by M bits, wherein M is an integer less than the N, each codepoint in the M bits is used to indicate the terminal state for a plurality of Scells, and N is an integer greater than 1;

wherein the power-saving signal only carries the N bits or the M bits.

8. The network device according to claim 7, wherein in a case that the power-saving signal indicates the terminal to start DRX onduration timers of all Scells, the power-saving signal indicates the terminal to determine the terminal states for N Scells according to the N bits or the M bits.

9. The network device according to claim 7, wherein in a case that the power-saving signal indicates that the DRX onduration timers of all Scells are not started, and the N bits or the M bits indicate the terminal in at least one Scell is a non-dormant state, the terminal does not expect to receive the power-saving signal; or the terminal performs the non-dormancy behavior for the at least one Scell.

10. The network device according to claim 7, wherein in a case that the power-saving signal indicates that the DRX onduration timers of all Scells are not started, the terminal determines that the bit indicating the terminal in the Scell in the power-saving signal is invalid, or determines that the terminal in the Scell is a non-dormant state.

11. The network device according to claim 7, wherein the power-saving signal indicates the behavior of the terminal by 1 bit;

in a case that the 1 bit is a first value, it indicates at least one of the following: starting the DRX onduration timers of all Scells and monitoring the PDCCHs of all Scells; and in a case that the 1 bit is a second value, it indicates at least one of the following: not starting the DRX onduration timers of all Scells and not monitoring the PDCCHs of all Scells.

12. The network device according to claim 7, wherein in the dormant state, the terminal does not monitor the PDCCH of the Scell, or in the dormant state, the monitoring period for the terminal to monitor the PDCCH of the Scell is a first period; and in the non-dormant state, the monitoring period for the terminal to monitor the PDCCH of the Scell is a second period, wherein the duration of the first period is greater than the duration of the second period.

13. A terminal, comprising a memory, a processor, and a program stored in the memory and capable of running on the processor, wherein when the program is executed by the processor, following steps are implemented:

receiving a power-saving signal, wherein the power-saving signal is used to indicate a terminal state for a secondary cell (Scell), and the power-saving signal is further used to indicate a behavior of the terminal;

the terminal state is one of dormancy and non-dormancy; and the behavior of the terminal comprises at least one of the following:

whether to start a discontinuous reception (DRX) onduration timer or not, and whether to monitor a physical downlink control channel (PDCCH) of the Scell, wherein the PDCCH is a PDCCH corresponding to a DRX onduration timer associated with the power-saving signal;

wherein the power-saving signal indicates the terminal state for N Scells respectively by N bits; or the power-saving signal indicates the terminal state for N Scells by M bits, wherein M is an integer less than the N, each codepoint in the M bits is used to indicate the terminal state for a plurality of Scells, and N is an integer greater than 1;

wherein the power-saving signal only carries the N bits or the M bits.

14. The terminal according to claim 13, wherein in a case that the power-saving signal indicates the terminal to start DRX onduration timers of all Scells, the terminal determines the terminal states for N Scells according to the N bits or the M bits.

15. The terminal according to claim 13, wherein in a case that the power-saving signal indicates that the DRX onduration timers of all Scells are not started, and the N bits or the M bits indicate the terminal in at least one Scell is a non-dormant state, the terminal does not expect to receive the power-saving signal; or the terminal performs non-dormancy behavior for the at least one Scell.

* * * * *